US012742476B2

(12) United States Patent
Ohki et al.

(10) Patent No.: US 12,742,476 B2

(45) **Date of Patent: *Sep. 22, 2026**

(54) BEARING PART

(71) Applicant: NTN CORPORATION, Osaka (JP)

(72) Inventors: Chikara Ohki, Kuwana (JP); Masahiro Yamada, Kuwana (JP)

(73) Assignee: NTN Corporation, Osaka (JP)

( * ) Notice: Subject to any disclaimer, the term of this patent is extended or adjusted under 35 U.S.C. 154(b) by 1032 days.

This patent is subject to a terminal disclaimer.

(21) Appl. No.: 17/043,583

(22) PCT Filed: Mar. 26, 2019

(86) PCT No.: PCT/JP2019/012700

§ 371 (c)(1),
(2) Date: Sep. 29, 2020

(87) PCT Pub. No.: WO2019/189087

PCT Pub. Date: Oct. 3, 2019

(65) Prior Publication Data

US 2021/0025452 A1 Jan. 28, 2021

(30) Foreign Application Priority Data

Mar. 30, 2018 (JP) ................................ 2018-067676

(51) Int. Cl.
*C21D 1/18* (2006.01)
*C21D 6/00* (2006.01)
(Continued)

(52) U.S. Cl.
CPC .............. *F16C 33/121* (2013.01); *C21D 1/18* (2013.01); *C21D 6/004* (2013.01); *C21D 9/40* (2013.01); *C21D 2211/008* (2013.01)

(58) Field of Classification Search
CPC ... C21D 1/06; C21D 1/18; C21D 1/26; C21D 2211/001; C21D 2211/008; C21D 6/004;
(Continued)

(56) References Cited

U.S. PATENT DOCUMENTS 5,084,116 A 1/1992 Mitamura
5,338,377 A 8/1994 Mitamura et al.
(Continued)

FOREIGN PATENT DOCUMENTS

CA 2712096 A1 8/2009
CN 1421541 A 6/2003
(Continued)

OTHER PUBLICATIONS

NPL: on-line translation of JP-4114218-B2, Jul. 2008 (Year: 2008).*
(Continued)

*Primary Examiner* — Jie Yang
(74) *Attorney, Agent, or Firm* — RIMON P.C.

(57) ABSTRACT

A bearing part is composed of a steel, and includes a quench-hardened layer in a surface of the bearing part. The quench-hardened layer includes a plurality of martensite crystal grains. A ratio of a total area of the plurality of martensite crystal grains in the quench-hardened layer is more than or equal to 70%. The plurality of martensite crystal grains are classified into a first group and a second group. A minimum value of crystal grain sizes of the martensite crystal grains belonging to the first group is larger than a maximum value of crystal grain sizes of the martensite crystal grains belonging to the second group.

3 Claims, 12 Drawing Sheets

(51) Int. Cl.
*C21D 9/40* (2006.01)
*F16C 33/12* (2006.01)

(58) Field of Classification Search
CPC .. C21D 9/40; C22C 38/00; C23C 8/02; C23C 8/32; C23C 8/80; F16C 2202/04; F16C 2223/16; F16C 33/121; F16C 33/62; F16C 33/64
USPC .......................................................... 420/110
See application file for complete search history.

(56) References Cited

U.S. PATENT DOCUMENTS

| | | | | |
|---|---|---|---|---|
| 5,660,647 | A | 8/1997 | Mitamura et al. | |
| 5,672,014 | A | 9/1997 | Okita et al. | |
| 5,853,249 | A | 12/1998 | Maeda et al. | |
| 6,071,358 | A | 6/2000 | Okita et al. | |
| 6,095,692 | A | 8/2000 | Takemura | |
| 6,149,734 | A | 11/2000 | Isogai et al. | |
| 6,290,398 | B1 | 9/2001 | Fujiwara et al. | |
| 8,535,457 | B2 | 9/2013 | Maeda | |
| 8,591,371 | B2 | 11/2013 | Dinter et al. | |
| 11,137,031 | B2 | 10/2021 | Yamada et al. | |
| 12,163,555 | B2 | 12/2024 | Yamada et al. | |
| 2001/0001396 | A1 | 5/2001 | Takayama et al. | |
| 2003/0123769 | A1* | 7/2003 | Ohki | C23C 8/32 384/492 |
| 2006/0162823 | A1 | 7/2006 | Omori et al. | |
| 2006/0204155 | A1 | 9/2006 | Watanabe et al. | |
| 2007/0196039 | A1 | 8/2007 | Kawaguchi et al. | |
| 2008/0006347 | A1 | 1/2008 | Kizawa et al. | |
| 2008/0047633 | A1 | 2/2008 | Kizawa et al. | |
| 2008/0118196 | A1 | 5/2008 | Watanabe et al. | |
| 2008/0163839 | A1 | 7/2008 | Watanabe et al. | |
| 2010/0150489 | A1 | 6/2010 | Maeda | |
| 2010/0296764 | A1 | 11/2010 | Strandell et al. | |
| 2012/0020605 | A1 | 1/2012 | Mori | |
| 2013/0016937 | A1 | 1/2013 | Tsutsui et al. | |
| 2013/0183191 | A1 | 7/2013 | Kaizuka et al. | |
| 2013/0301969 | A1 | 11/2013 | Yuki et al. | |
| 2014/0099051 | A1 | 4/2014 | Yoshida et al. | |
| 2014/0254970 | A1 | 9/2014 | Guilford | |
| 2014/0299237 | A1 | 10/2014 | Somani et al. | |
| 2014/0363115 | A1 | 12/2014 | Yamada et al. | |
| 2015/0259764 | A1 | 9/2015 | Hidaka et al. | |
| 2016/0123397 | A1 | 5/2016 | Sato et al. | |
| 2016/0178009 | A1 | 6/2016 | Sato et al. | |
| 2016/0289785 | A1 | 10/2016 | Matsuzawa et al. | |
| 2016/0333437 | A1 | 11/2016 | Sakamoto et al. | |
| 2016/0333438 | A1 | 11/2016 | Sakamoto et al. | |
| 2017/0121786 | A1 | 5/2017 | Miyamoto et al. | |
| 2017/0314117 | A1 | 11/2017 | Yoshida | |
| 2017/0328408 | A1 | 11/2017 | Hosseini et al. | |
| 2018/0363694 | A1 | 12/2018 | Ohno | |
| 2020/0003259 | A1 | 1/2020 | Yamada et al. | |
| 2020/0172990 | A1 | 6/2020 | Nishida | |
| 2020/0378442 | A1 | 12/2020 | Yamada et al. | |
| 2021/0025452 | A1 | 1/2021 | Ohki et al. | |
| 2022/0389960 | A1* | 12/2022 | Yamauchi | C21D 1/26 |
| 2022/0411891 | A1* | 12/2022 | Kawai | C21D 1/06 |
| 2024/0035515 | A1 | 2/2024 | Fujimura et al. | |

FOREIGN PATENT DOCUMENTS

| | | | | |
|---|---|---|---|---|
| CN | 1611628 | A | 5/2005 | |
| CN | 1701128 | A | 11/2005 | |
| CN | 1946863 | A | 4/2007 | |
| CN | 1993561 | A | 7/2007 | |
| CN | 102362000 | A | 2/2012 | |
| CN | 102822546 | A | 12/2012 | |
| CN | 103237913 | A | 8/2013 | |
| CN | 103710517 | A | 4/2014 | |
| CN | 105121877 | A | 12/2015 | |
| CN | 105671447 | A | 6/2016 | |
| CN | 105745338 | A | 7/2016 | |
| CN | 107746948 | A | 3/2018 | |
| CN | 112119169 | A | 12/2020 | |
| EP | 1517058 | A1 | 3/2005 | |
| EP | 1701052 | A2 | 3/2006 | |
| EP | 2789709 | A1 | 10/2014 | |
| JP | H02-277764 | A | 11/1990 | |
| JP | H03-64431 | A | 3/1991 | |
| JP | H05-78814 | A | 3/1993 | |
| JP | H08-49057 | A | 2/1996 | |
| JP | H08-303470 | A | 11/1996 | |
| JP | H08-311603 | A | 11/1996 | |
| JP | H09202919 | A | 8/1997 | |
| JP | H10-176219 | A | 6/1998 | |
| JP | H11-201168 | A | 7/1999 | |
| JP | H11-217626 | A | 8/1999 | |
| JP | 2001-073035 | A | 3/2001 | |
| JP | 2001-323939 | A | 11/2001 | |
| JP | 2001-330101 | | 11/2001 | |
| JP | 2001-330101 | A | 11/2001 | |
| JP | 2002-206523 | A | 7/2002 | |
| JP | 2003-129176 | A | 5/2003 | |
| JP | 2003-226919 | A | 8/2003 | |
| JP | 2005-090680 | A | 4/2005 | |
| JP | 2005-298877 | A | 10/2005 | |
| JP | 2005-314789 | A | 11/2005 | |
| JP | 2006-046417 | A | 2/2006 | |
| JP | 2006-063353 | | 3/2006 | |
| JP | 2006-083988 | A | 3/2006 | |
| JP | 2006-144889 | A | 6/2006 | |
| JP | 2006-250294 | A | 9/2006 | |
| JP | 2006-329268 | A | 12/2006 | |
| JP | 2007-016848 | A | 1/2007 | |
| JP | 3905430 | B2 | 4/2007 | |
| JP | 2007-113027 | A | 5/2007 | |
| JP | 2007-182603 | A | 7/2007 | |
| JP | 2007-182609 | A | 7/2007 | |
| JP | 2007-182926 | A | 7/2007 | |
| JP | 2007-232201 | A | 9/2007 | |
| JP | 2007-255485 | A | 10/2007 | |
| JP | 4114218 | B2 * | 7/2008 | C22C 38/04 |
| JP | 2008-208401 | | 9/2008 | |
| JP | 2008-255399 | A | 10/2008 | |
| JP | 2008-285725 | A | 11/2008 | |
| JP | 2010-222678 | A | 10/2010 | |
| JP | 2011-184768 | A | 9/2011 | |
| JP | 2012-062515 | A | 3/2012 | |
| JP | 2013-011010 | A | 1/2013 | |
| JP | 2013-160314 | A | 8/2013 | |
| JP | 2014101896 | A | 6/2014 | |
| JP | 5592540 | B1 | 9/2014 | |
| JP | 2015-094015 | A | 5/2015 | |
| JP | 2018-168433 | A | 11/2018 | |
| JP | 2019-039044 | A | 3/2019 | |
| JP | 2019-059983 | A | 4/2019 | |
| JP | 2019-108576 | A | 7/2019 | |
| JP | 2019-178727 | A | 10/2019 | |
| JP | 6626918 | B2 | 12/2019 | |
| WO | 2006/068205 | A1 | 6/2006 | |
| WO | 2015/105186 | A1 | 7/2015 | |
| WO | 2015/105187 | A1 | 7/2015 | |
| WO | 2016/194272 | A1 | 12/2016 | |
| WO | 2017/099071 | A1 | 6/2017 | |
| WO | 2018/159840 | A1 | 9/2018 | |
| WO | 2019/065622 | A1 | 4/2019 | |

OTHER PUBLICATIONS

NPL: on-line translation of JP2001330101A, Nov. 2001, (Year: 2001).*

NPL: Celada-Casero et al.(The role of the austenite grain size in the martensite transformation in low carbon steel, Materials and Design, 167 (2019) 107625, pp. 1-10 (Year: 2019).*

Chinese Office Action issued in corresponding Chinese Patent Application No. 201980023867.X, dated Aug. 22, 2022, with English translation.

(56) References Cited

OTHER PUBLICATIONS

International Search Report issued in corresponding International Patent Application No. PCT/JP2019/012700, dated Jun. 25, 2019, with English translation.
Extended European Search Report issued in corresponding European Patent Application No. 19776628.0, dated Oct. 19, 2021.
Chinese Office Action issued in corresponding Chinese Patent Application No. 201980023867.X, dated Feb. 8, 2022, with English translation.
The International Search Report issued in International Application No. PCT/JP2020/036661, mailed on Nov. 24, 2020 w/English Translation.
International Search Report issued in corresponding International Patent Application No. PCT/JP2020/034079 dated Nov. 24, 2020, with English translation.
JFS; "SUJ2", https://www.jfs-steel.com/en/product/SUJ2.html; retrieved on Nov. 22, 2024 (Year: 2024).
Cronidur® 30, "Energietechnik Essen", Maximum Demand by Corrosive Stress Wear, retrieved from internet on May 21, 2025; https://progalloysteel.wpengine.com/wp-content/uploads/2020/02cronidur30.pdf (Year: 2008).
International Search Report issued in International Application No. PCT/JP2021/034141, mailed on Nov. 16, 2021 w/English Translation.
Chinese Office Action issued in corresponding Chinese Patent Application No. 201880015417.1, dated Apr. 20, 2022, with English Translation.
"Metal Materials and Heat Treatment," compiled by the Agricultural Machinery Industry Bureau of the Ministry of Machinery Industry, Machinery Industry Press, Aug. 1987, p. 108, with partial English translation.
Japanese Office Action issued in corresponding Japanese Patent Application No. 2021-006648, dated Sep. 21, 2021, with English Translation.
Japanese Office Action issued in corresponding Japanese Patent Application No. 2021-006650, dated Sep. 21, 2021, with English Translation.
Japanese Office Action issued in corresponding Japanese Patent Application No. 2021-006653, dated Sep. 21, 2021, with English Translation.
Chinese Office Action issued in corresponding Chinese Patent Application No. 201880015417.1, dated Jun. 9, 2021, with English translation.
Japanese Office Action issued in corresponding Japanese Patent Application No. 2017-241498, dated Dec. 22, 2020, with English translation.
Extended European Search Report issued in corresponding European Patent Application No. 18760826,0, dated Jul. 3, 2020.
International Search Report issued in corresponding International Patent Application No. PCT/JP2018/008147 dated May 1, 2018, with English Translation.
International Search Report issued in corresponding International Patent Application No. PCT/JP2018/044709, dated Feb. 19, 2019, with English Translation.

* cited by examiner

FIG. 11

BEARING PART

TECHNICAL FIELD

The present invention relates to a bearing part.

BACKGROUND ART

A rolling fatigue life of a bearing part is improved by carbonitriding a surface of the bearing part (a raceway surface of each of an inner ring and an outer ring as well as a rolling contact surface of a rolling element) as described in Patent Literature 1 (Japanese Patent No. 5592540). Moreover, the rolling fatigue life of the rolling bearing is improved by attaining fine prior austenite grains in the surface of the bearing part as described in Patent Literature 2 (Japanese Patent No. 3905430).

CITATION LIST

Patent Literature

PTL 1: Japanese Patent No. 5592540
PTL 2: Japanese Patent No. 3905430

SUMMARY OF INVENTION

Technical Problem

A steel used for the bearing part is generally quenched. That is, a quench-hardened layer having a structure mainly composed of a martensite phase is formed in the surface of the bearing part. However, it has not been conventionally known how states of martensite crystal grains affect the rolling fatigue life of the bearing part.

The present invention has been made in view of the above-described problem of the conventional art. More specifically, the present invention is to provide a bearing part having an improved rolling fatigue life.

Solution to Problem

A bearing part according to a first implementation of the present invention is composed of a steel, and includes a quench-hardened layer in a surface of the bearing part. The quench-hardened layer includes a plurality of martensite crystal grains. A ratio of a total area of the plurality of martensite crystal grains in the quench-hardened layer is more than or equal to 70%, The plurality of martensite crystal grains are classified into a first group and a second group. A minimum value of crystal grain sizes of the martensite crystal grains belonging to the first group is larger than a maximum value of crystal grain sizes of the martensite crystal grains belonging to the second group. A value obtained by dividing a total area of the martensite crystal grains belonging to the first group by the total area of the plurality of martensite crystal grains is more than or equal to 0.5. A value obtained by dividing, by the total area of the plurality of martensite crystal grains, a total area of the martensite crystal grains belonging to the first group except for a martensite crystal grain that has a minimum crystal grain size and that belongs to the first group is less than 0.5. An average grain size of the martensite crystal grains belonging to the first group is less than or equal to 0.97 μm.

In the bearing part according to the first implementation of the present invention, an average aspect ratio of the martensite crystal grains belonging to the first group may be less than or equal to 2.57.

A bearing part according to a second implementation of the present invention is composed of a steel, and includes a quench-hardened layer in a surface of the bearing part. The quench-hardened layer includes a plurality of martensite crystal grains. A ratio of a total area of the plurality of martensite crystal grains in the quench-hardened layer is more than or equal to 70%. The plurality of martensite crystal grains are classified into a third group and a fourth group. A minimum value of crystal grain sizes of the martensite crystal grains belonging to the third group is larger than a maximum value of crystal grain sizes of the martensite crystal grains belonging to the fourth group. A value obtained by dividing a total area of the martensite crystal grains belonging to the third group by the total area of the plurality of martensite crystal grains is more than or equal to 0.7. A value obtained by dividing, by the total area of the plurality of martensite crystal grains, a total area of the martensite crystal grains belonging to the third group except for a martensite crystal grain that has a minimum crystal grain size and that belongs to the third group is less than 0.7. An average grain size of the martensite crystal grains belonging to the third group is less than or equal to 0.75 μm.

In the bearing part according to the second implementation of the present invention, an average aspect ratio of the martensite crystal grains belonging to the third group may be less than or equal to 2.45.

In the bearing part according to each of the first and second implementations of the present invention, the steel may be a high carbon chromium bearing steel SUJ2 defined in JIS.

In the bearing part according to each of the first and second implementations of the present invention, a hardness of the quench-hardened layer in the surface may be more than or equal to 730 Hv.

In the bearing part according to each of the first and second implementations of the present invention, the quench-hardened layer may contain nitrogen. An average nitrogen concentration of the quench-hardened layer may be more than or equal to 0.15 mass % between the surface and a position at a distance of 10 μm from the surface.

Advantageous Effects of Invention

According to the bearing part according to each of the first and second implementations of the present invention, a rolling fatigue life can be improved.

BRIEF DESCRIPTION OF DRAWINGS

FIG. 11 is a graph showing a relation between the average grain size of the martensite crystal grains and a static load capacity.

DESCRIPTION OF EMBODIMENTS

Figure 1:
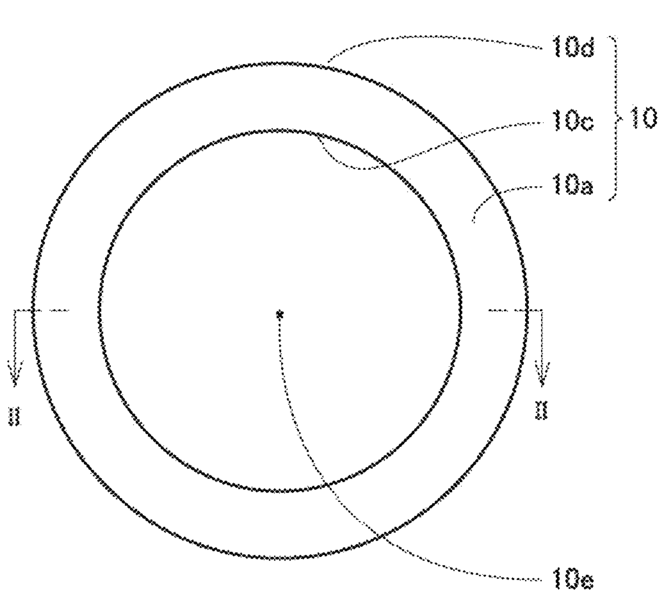
FIG. 1 is a top view of an inner ring 10.

Details of embodiments of the present invention will be described with reference to figures. It should be noted that in the below-described figures, the same or corresponding portions are given the same reference characters and are not described repeatedly.

Configuration of Bearing Part According to Embodiment

The following describes a configuration of a bearing part according to an embodiment. It should be noted that in the description below, an inner ring 10 of a rolling bearing will be illustratively described as an exemplary bearing part according to the embodiment; however, the bearing part according to the embodiment is not limited to this. Specifically, the bearing part according to the embodiment may be an outer ring of a rolling bearing or a rolling element of the rolling bearing.

Inner ring 10 is composed of a steel. The steel of inner ring 10 is a high carbon chromium bearing steel defined in JIS (JIS G 4805: 2008). The steel of inner ring 10 is preferably SUJ2 defined in JIS.

Figure 2:
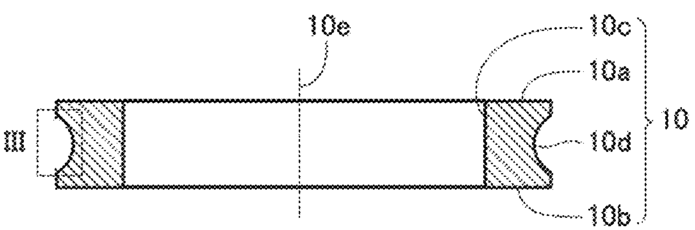
FIG. 2 is a cross sectional view taken along II-II of FIG. 1.

FIG. 1 is a top view of inner ring 10. FIG. 2 is a cross sectional view along II-II of FIG. 1. As shown in FIG. 1 and FIG. 2, inner ring 10 has a ring shape. Inner ring 10 has an upper surface 10*a*, a bottom surface 10*b*, an inner circumferential surface 10*c*, an outer circumferential surface 10*d*, and a center axis 10*e*.

Upper surface 10*a* and bottom surface 10*b* constitute respective end surfaces in a direction along center axis 10*e*. Bottom surface 10*b* is a surface opposite to upper surface 10*a*. Inner circumferential surface 10*c* and outer circumferential surface 10*d* are continuous to upper surface 10*a* and bottom surface 10*b*. A distance between inner circumferential surface 10*c* and center axis 10*e* is smaller than a distance between outer circumferential surface 10*d* and center axis 10*e*. A raceway groove is provided in outer circumferential surface 10*d*. Upper surface 10*a*, bottom surface 10*b*, inner circumferential surface 10*c*, and outer circumferential surface 10*d* constitute a surface of inner ring 10. Outer circumferential surface 10*d* constitutes a raceway surface of inner ring 10.

Figure 3:
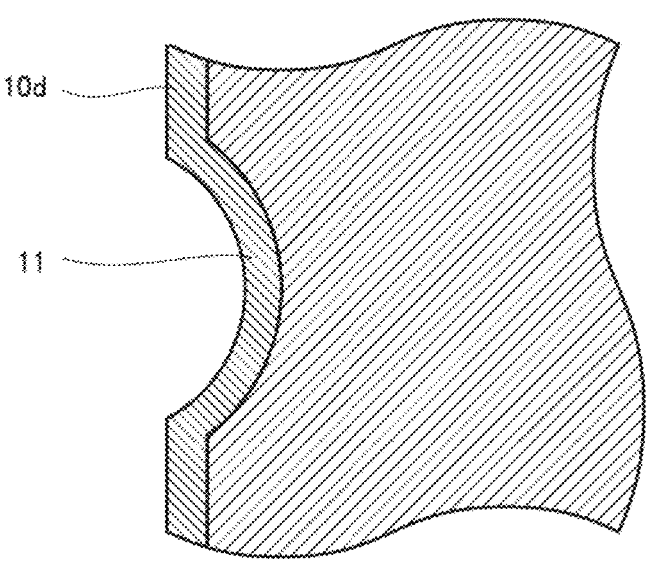
FIG. 3 is an enlarged view at III in FIG. 2.

FIG. 3 is an enlarged view at III in FIG. 2. As shown in FIG. 3, inner ring 10 has a quench-hardened layer 11. Quench-hardened layer 11 is provided in the surface of inner ring 10. Quench-hardened layer 11 includes a plurality of martensite crystal grains. Each of the plurality of martensite crystal grains is a crystal grain constituted of a martensite phase.

When a deviation is more than or equal to 15° between the crystal orientation of a first martensite crystal grain and the crystal orientation of a second martensite crystal grain adjacent to the first martensite crystal grain, the first and second martensite crystal grains are different martensite crystal grains. On the other hand, when the deviation is less than 15° between the crystal orientation of the first martensite crystal grain and the crystal orientation of the second martensite crystal grain adjacent to the first martensite crystal grain, the first and second martensite crystal grains constitute one martensite crystal grain.

Quench-hardened layer 11 has a structure mainly composed of the martensite phase. More specifically, a ratio of a total area of the plurality of martensite crystal grains in quench-hardened layer 11 is more than or equal to 70%. The ratio of the total area of the plurality of martensite crystal grains in quench-hardened layer 11 may be more than or equal to 80%.

Quench-hardened layer 11 includes austenite crystal grains in addition to the plurality of martensite crystal grains. A ratio of a total area of the austenite crystal grains in quench-hardened layer 11 is preferably less than or equal to 30%. The ratio of the total area of the austenite crystal grains in quench-hardened layer 11 is more preferably less than or equal to 20%.

The plurality of martensite crystal grains are classified into a first group and a second group. A minimum value of crystal grain sizes of the martensite crystal grains belonging to the first group is larger than a maximum value of crystal grain sizes of the martensite crystal grains belonging to the second group.

A value obtained by dividing a total area of the martensite crystal grains belonging to the first group by the total area of the plurality of martensite crystal grains (the sum of the total area of the martensite crystal grains belonging to the first group and the total area of the martensite crystal grains belonging to the second group) is more than or equal to 0.5.

A value obtained by dividing, by the total area of the plurality of martensite crystal grains, the total area of the martensite crystal grains belonging to the first group except for a martensite crystal grain that has a minimum crystal grain size and that belongs to the first group is less than 0.5.

From another viewpoint, it can be said that the plurality of martensite crystal grains are assigned to the first group in the order from one having the largest crystal grain size. The assignment to the first group is ended when the total area of the martensite crystal grains assigned to the first group until then becomes 0.5 or more time as large as the total area of the plurality of martensite crystal grains. A remainder of the plurality of martensite crystal grains are assigned to the second group.

An average grain size of the martensite crystal grains belonging to the first group is less than or equal to 0.97 μm. The average grain size of the martensite crystal grains belonging to the first group is preferably less than or equal to 0.90 μm. The average grain size of the martensite crystal grains belonging to the first group is more preferably less than or equal to 0.85 μm.

An aspect ratio of each of the martensite crystal grains belonging to the first group is less than or equal to 2.57. The aspect ratio of each of the martensite crystal grains belonging to the first group is preferably less than or equal to 2.50. The aspect ratio of each of the martensite crystal grains belonging to the first group is more preferably less than or equal to 2.45.

The plurality of martensite crystal grains may be classified into a third group and a fourth group. A minimum value of crystal grain sizes of the martensite crystal grains belonging to the third group is larger than a maximum value of crystal grain sizes of the martensite crystal grains belonging to the fourth group.

A value obtained by dividing a total area of the martensite crystal grains belonging to the third group by the total area of the plurality of martensite crystal grains (the sum of the total area of the martensite crystal grains belonging to the third group and the total area of the martensite crystal grains belonging to the fourth group) is more than or equal to 0.7.

A value obtained by dividing, by the total area of the plurality of martensite crystal grains, the total area of the martensite crystal grains belonging to the third group except for a martensite crystal grain that has a minimum crystal grain size and that belongs to the third group is less than 0.7.

From another viewpoint, it can be said that the plurality of martensite crystal grains are assigned to the third group in the order from one having the largest crystal grain size. The assignment to the third group is ended when the total area of the martensite crystal grains assigned to the third group until then becomes 0.7 or more time as large as the total area of the plurality of martensite crystal grains. A remainder of the plurality of martensite crystal grains are assigned to the fourth group.

An average grain size of the martensite crystal grains belonging to the third group is less than or equal to 0.75 μm. The average grain size of the martensite crystal grains belonging to the third group is preferably less than or equal to 0.70 μm. The average grain size of the martensite crystal grains belonging to the third group is more preferably less than or equal to 0.65 μm.

An aspect ratio of each of the martensite crystal grains belonging to the third group is less than or equal to 2.45. The aspect ratio of each of the martensite crystal grains belonging to the third group is preferably less than or equal to 2.40. The aspect ratio of each of the martensite crystal grains belonging to the third group is more preferably less than or equal to 2.35.

The average crystal grain size of the martensite crystal grains belonging to the first group (third group) and the aspect ratio of each of the martensite crystal grains belonging to the first group (third group) are measured using an EBSD (Electron Backscattered Diffraction) method.

This will be described more in detail as follows. First, a cross section image (hereinafter, referred to as "EBSD image") in quench-hardened layer 11 is captured based on the EBSD method. The EBSD image is captured to include a sufficient number (more than or equal to 20) of martensite crystal grains. A boundary between adjacent martensite crystal grains is specified based on the EBSD image. Second, based on the specified boundary between the martensite crystal grains, the area and shape of each martensite crystal grain in the EBSD image are calculated.

More specifically, by calculating the square root of a value obtained by dividing the area of each martensite crystal grain in the EBSD image by π/4, the equivalent circle diameter of each martensite crystal grain in the EBSD image is calculated.

Based on the equivalent circle diameter of each martensite crystal grain calculated as described above, the martensite crystal grains belonging to the first group (third group) among the martensite crystal grains in the EBSD image are determined. The value obtained by dividing, by the total area of the martensite crystal grains in the EBSD image, the total area of the martensite crystal grains belonging to the first group (third group) among the martensite crystal grains in the EBSD image is regarded as the value obtained by dividing the total area of the martensite crystal grains belonging to the first group (third group) by the total area of the plurality of martensite crystal grains.

Based on the equivalent circle diameter of each martensite crystal grain calculated as described above, the martensite crystal grains in the EBSD image are classified into the first group and the second group (or classified into the third group and the fourth group). The value obtained by dividing, by the number of the martensite crystal grains classified into the first group (third group) in the EBSD image, the total of the equivalent circle diameters of the martensite crystal grains classified into the first group (third group) in the EBSD image is regarded as the average grain size of the martensite crystal grains belonging to the first group (third group).

From the shape of each martensite crystal grain in the EBSD image, the shape of each martensite crystal grain in the EBSD image is approximated to an ellipse by the least squares method. This approximation to an ellipse by the least squares method is performed in accordance with a method described in S. Biggin and D. J. Dingley, Journal of Applied Crystallography, (1977) 10, 376-378. By dividing the size in the major axis by the size in the minor axis in this elliptical shape, the aspect ratio of each martensite crystal grain in the EBSD image is calculated. A value obtained by dividing the total of the aspect ratios of the martensite crystal grains classified into the first group (third group) in the EBSD image by the number of the martensite crystal grains classified into the first group (third group) in the EBSD image is regarded as the average aspect ratio of the martensite crystal grains belonging to the first group (third group).

Quench-hardened layer 11 contains nitrogen. An average nitrogen concentration of quench-hardened layer 11 is preferably more than or equal to 0.15 mass % between the surface and a position at a distance of 10 μm from the surface. This average nitrogen concentration is less than or equal to 0.20 mass %, for example. It should be noted that this average nitrogen concentration is measured using an EPMA (Electron Probe Micro Analyzer).

A hardness of quench-hardened layer 11 in the surface is preferably more than or equal to 730 Hv. It should be noted that the hardness of quench-hardened layer 11 in the surface is measured in accordance with JIS (JIS Z 2244: 2009).

Method for Manufacturing Bearing Part According to Embodiment

A method for manufacturing inner ring 10 will be described below as an exemplary method for manufacturing the bearing part according to the embodiment.

Figure 4:
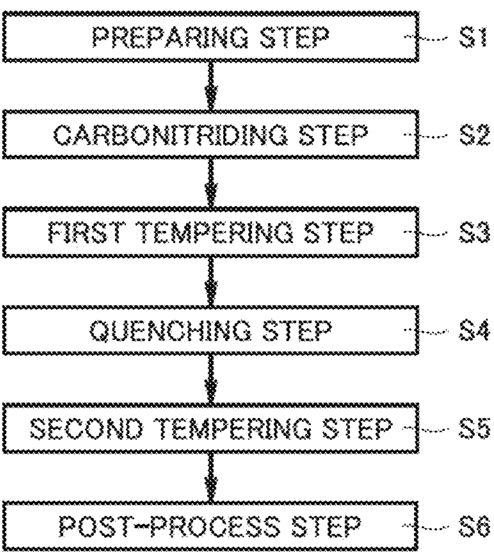
FIG. 4 is a process chart showing a method for manufacturing inner ring 10.

FIG. 4 is a process chart showing the method for manufacturing the bearing part according to the embodiment. As shown in FIG. 4, the method for manufacturing the bearing part according to the embodiment includes a preparing step S1, a carbonitriding step S2, a first tempering step S3, a quenching step S4, a second tempering step S5, and a post-process step S6.

In preparing step S1, a processing target member having a ring shape is prepared. The processing target member is formed into inner ring 10 by performing carbonitriding step S2, first tempering step S3, quenching step S4, second tempering step S5 and post-process step S6 thereto. In preparing step S1, first, the processing target member is subjected to hot forging. In preparing step S1, second, the processing target member is subjected to cold forging. The cold forging is preferably performed to attain a diameter expansion ratio (the diameter of the processing target member after the cold forging/the diameter of the processing target member before the cold forging) of more than or equal to 1.1 and less than or equal to 1.3. In preparing step S1, third, cutting is performed to provide the processing target member with a shape close to the shape of inner ring 10.

In carbonitriding step S2, first, by heating the processing target member to a temperature of more than or equal to a first temperature, the processing target member is carbonitrided. The first temperature is a temperature of more than or equal to an $A_1$ transformation point of the steel of the processing target member. In carbonitriding step S2, second, the processing target member is cooled. This cooling is performed such that the temperature of the processing target member becomes less than or equal to an Ms transformation point.

In first tempering step S3, the processing target member is tempered. First tempering step S3 is performed by holding the processing target member at a second temperature for a first period of time. The second temperature is a temperature of less than the $A_1$ transformation point. The second temperature is more than or equal to 160° C. and less than or equal to 200° C., for example. The first period of time is more than or equal to 1 hour and less than or equal to 4 hours, for example.

In quenching step S4, the processing target member is quenched. In quenching step S4, first, the processing target member is heated to a third temperature. The third temperature is a temperature of more than or equal to the $A_1$ transformation point of the steel of the processing target member. The third temperature is preferably lower than the first temperature. In quenching step S4, second, the processing target member is cooled. This cooling is performed such that the temperature of the processing target member becomes less than or equal to the Ms transformation point.

In second tempering step S5, the processing target member is tempered. Second tempering step S5 is performed by holding the processing target member at a fourth temperature for a second period of time. The fourth temperature is a temperature of less than the $A_1$ transformation point. The fourth temperature is more than or equal to 160° C. and less than or equal to 200° C., for example. The second period of time is more than or equal to 1 hour and less than or equal to 4 hours, for example. It should be noted that each of quenching step S4 and second tempering step S5 may be repeated multiple times.

In post-process step S6, the processing target member is post-processed. In post-process step S6, cleaning of the processing target member, machining of a surface of the processing target member, such as grinding or polishing, and the like are performed, for example. In this way, inner ring 10 is manufactured.

Effect of Bearing Part According to Embodiment

The following describes an effect of the bearing part according to the embodiment.

When material failure is considered in accordance with the weakest link model, portions each having a relatively low strength, i.e., martensite crystal grains each having a relatively large crystal grain size have a great influence on the material failure. In quench-hardened layer 11 of inner ring 10, the average grain size of the martensite crystal grains belonging to the first group (third group) is less than or equal to 0.97 μm (less than or equal to 0.75 μm). Accordingly, in inner ring 10, even such relatively large martensite crystal grains belonging to the first group (third group) are fine crystal grains, with the result that rolling fatigue strength and static load capacity are improved.

As the average aspect ratio of the martensite crystal grains becomes smaller, the shape of each of the martensite crystal grains becomes closer to a spherical shape, with the result that stress concentration is less likely to take place. Accordingly, when the average aspect ratio of the martensite crystal grains belonging to the first group (third group) is less than or equal to 2.57 (less than or equal to 2.45), the rolling fatigue strength and static load capacity can be further improved.

(Rolling Fatigue Test and Static Load Capacity Test)

The following describes a rolling fatigue test and a static load capacity test, each of which was performed to confirm the effect of the bearing part according to the embodiment.

<Test Specimens>

In each of the rolling fatigue test and the static load capacity test, samples 1, 2, and 3 were used. Each of samples 1 and 2 was composed of SUJ2. Sample 3 was composed of SCM435, which is a chromium-molybdenum steel defined in JIS (JIS G 4053: 2016).

Sample 1 was prepared in accordance with the method for manufacturing the bearing part according to the embodiment. More specifically, in the preparation of sample 1, the first temperature was set to 850° C., the second temperature was set to 180° C., the third temperature was set to 810° C., and the fourth temperature was set to 180° C. For each of samples 2 and 3, quenching step S4 and second tempering step S5 were not performed. In the preparation of sample 2, the first temperature was set to 850° C. and the second temperature was set to 180° C. In the preparation of sample 3, the first temperature was set to 930° C. and the second temperature was set to 170° C. The heat treatment conditions for samples 1 to 3 are shown in Table 1.

TABLE 1

| | First Temperature (° C.) | Second Temperature (° C.) | Third Temperature (° C.) | Fourth Temperature (° C.) |
|---|---|---|---|---|
| Sample 1 | 850 | 180 | 810 | 180 |
| Sample 2 | 850 | 180 | — | — |
| Sample 3 | 930 | 170 | — | — |

It should be noted that in each of samples 1 to 3, at a position at a distance of 50 μm from the surface, the ratio of the total area of the austenite crystal grains was more than or equal to 20% and less than or equal to 30%, the nitrogen concentration in the surface was more than or equal to 0.15 mass % and less than or equal to 0.20 mass %, and the hardness in the surface was 730 Hv.

In sample 1, the average grain size of the martensite crystal grains belonging to the first group was 0.80 μm, and the average aspect ratio of the martensite crystal grains belonging to the first group was 2.41. Moreover, in sample 1, the average grain size of the martensite crystal grains belonging to the third group was 0.64 μm, and the average aspect ratio of the martensite crystal grains belonging to the third group was 2.32.

In sample 2, the average grain size of the martensite crystal grains belonging to the first group was 1.11 μm, and the average aspect ratio of the martensite crystal grains belonging to the first group was 3.00. Moreover, in sample 2, the average grain size of the martensite crystal grains belonging to the third group was 0.84 μm, and the average aspect ratio of the martensite crystal grains belonging to the third group was 2.77.

In sample 3, the average grain size of the martensite crystal grains belonging to the first group was 1.81 μm, and the average aspect ratio of the martensite crystal grains belonging to the first group was 3.38. Moreover, in sample 2, the average grain size of the martensite crystal grains belonging to the third group was 1.28 μm, and the average aspect ratio of the martensite crystal grains belonging to the third group was 3.04.

Table 2 shows results of measurements of the average grain size and average aspect ratio of the martensite crystal grains in each of samples 1 to 3.

TABLE 2

| | First Group of Martensite Crystal Grains | | Third Group of Martensite Crystal Grains | |
|---|---|---|---|---|
| | Average Grain Size (μm) | Average Aspect Ratio | Average Grain Size (μm) | Average Aspect Ratio |
| Sample 1 | 0.80 | 2.41 | 0.64 | 2.32 |
| Sample 2 | 1.11 | 3.00 | 0.84 | 2.77 |
| Sample 3 | 1.81 | 3.38 | 1.28 | 3.04 |

Figure 5:
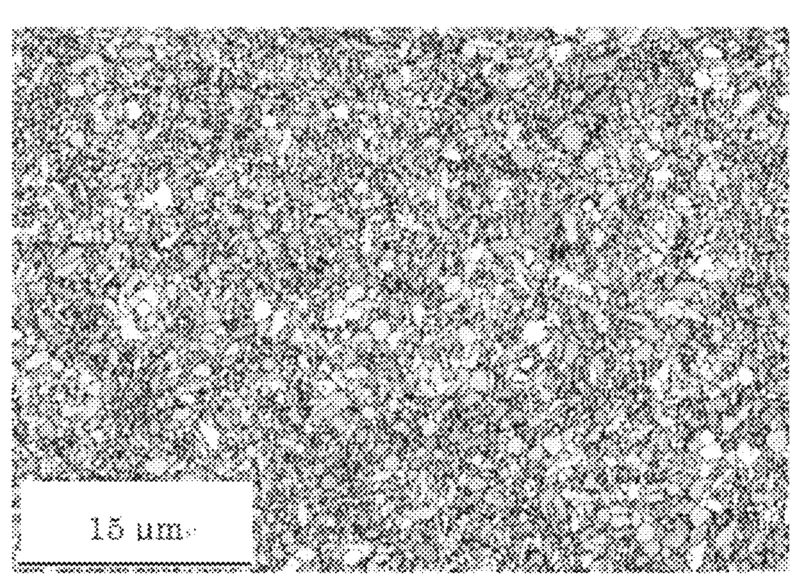
FIG. 5 shows an EBSD image at a cross section of a sample 1.
Figure 6:
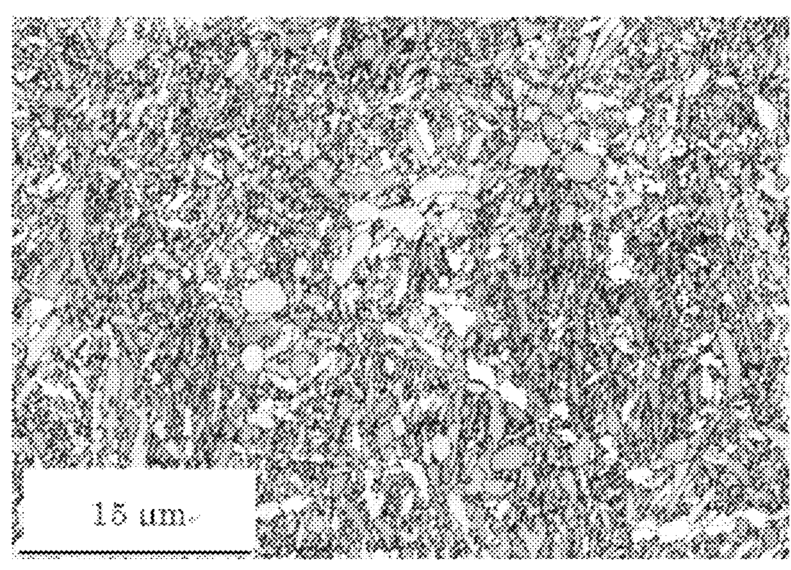
FIG. 6 shows an EBSD image at a cross section of a sample 2.
Figure 7:
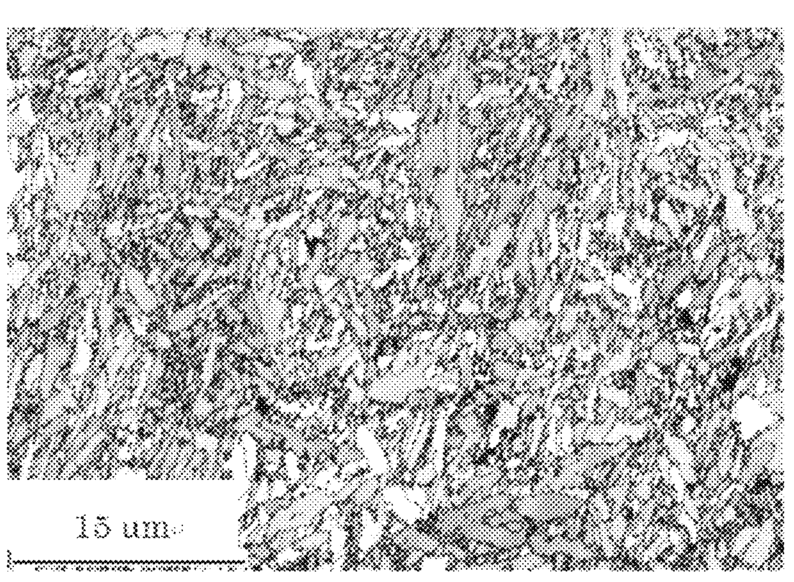
FIG. 7 shows an EBSD image at a cross section of a sample 3.

FIG. 5 shows an EBSD image at a cross section of sample 1. FIG. 6 shows an EBSD image at a cross section of sample 2. FIG. 7 shows an EBSD image at a cross section of sample 3. As shown in FIG. 5 to FIG. 7, it is understood that the martensite crystal grains in sample 1 are finer than those in each of samples 2 and 3.

<Rolling Fatigue Test Conditions>

In the rolling fatigue test, an inner ring, an outer ring, and a tapered roller were prepared using each of samples 1 and 3, and were used to produce a tapered roller bearing. The rolling fatigue test was performed under conditions that the rotating speed of the inner ring was 3000 rotations/min and the maximum contact pressure was 2.6 GPa. In the rolling fatigue test, bath lubrication was performed using VG56, which is a turbine oil. In this turbine oil, hard gas-atomized powder was mixed at a ratio of 0.2 g/l. The test conditions for the rolling fatigue test are shown in Table 3. It should be noted that the rolling fatigue test was performed onto six tapered roller bearings each produced using sample 1 and six tapered roller bearings each produced using sample 3.

TABLE 3

| | |
|---|---|
| Maximum Contact Pressure (GPa) | 2.6 |
| Rotating Speed of Inner Ring ($min^{-1}$) | 3000 |
| Lubrication | Bath Lubrication with Turbine Oil (VG56) |
| Special Note | 0.2 g/l of Hard Gas-Atomized Powder is Mixed in Lubricating Oil. |

<Static Load Capacity Test Conditions>

In the static load capacity test, flat plate-like members were produced using samples 1 to 3. The static load capacity test was performed by finding a relation between the maximum contact pressure and the indentation depth by pressing a ceramic ball composed of silicon nitride against a surface of each of the flat plate-like members having been mirror-finished. It should be noted that the static load capacity was evaluated in accordance with the maximum contact pressure when a value obtained by dividing the indentation depth by the diameter of the ceramic ball reached 1/10000 (when a value obtained by dividing the indentation depth by the diameter of the ceramic ball and multiplying by 10000 reached 1).

<Rolling Fatigue Test Results>

Each of the tapered roller bearings prepared using sample 1 had an $L_{50}$ life (50% failure life) of 50.4 hours. On the other hand, each of the tapered roller bearings prepared using sample 3 had an $L_{50}$ life of 31.2 hours. Thus, each of the tapered roller bearings produced using sample 1 had a rolling fatigue life improved twice or more as compared with that in each of the tapered roller bearings produced using sample 3. This test result is shown in Table 4.

TABLE 4

| | Sample 1 | Sample 3 |
|---|---|---|
| $L_{50}$ Life (Hours) | 50.4 | 31.2 |
| Number of Samples for Test | 6 | 6 |

Figure 8:
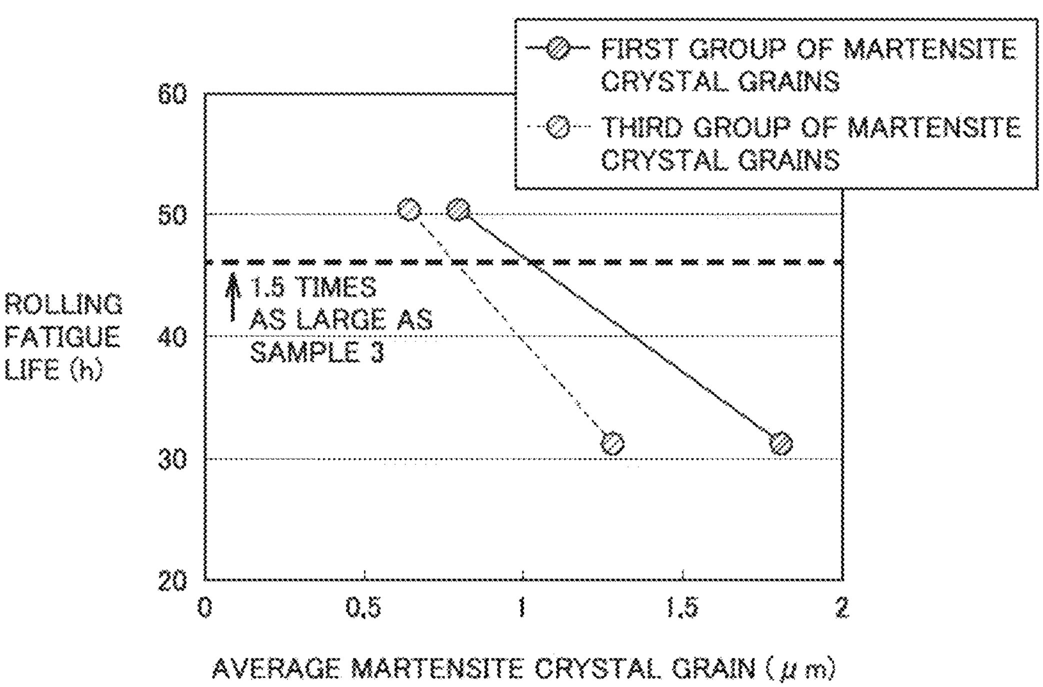
FIG. 8 is a graph showing a relation between an average grain size of martensite crystal grains and a rolling fatigue life.
Figure 9:
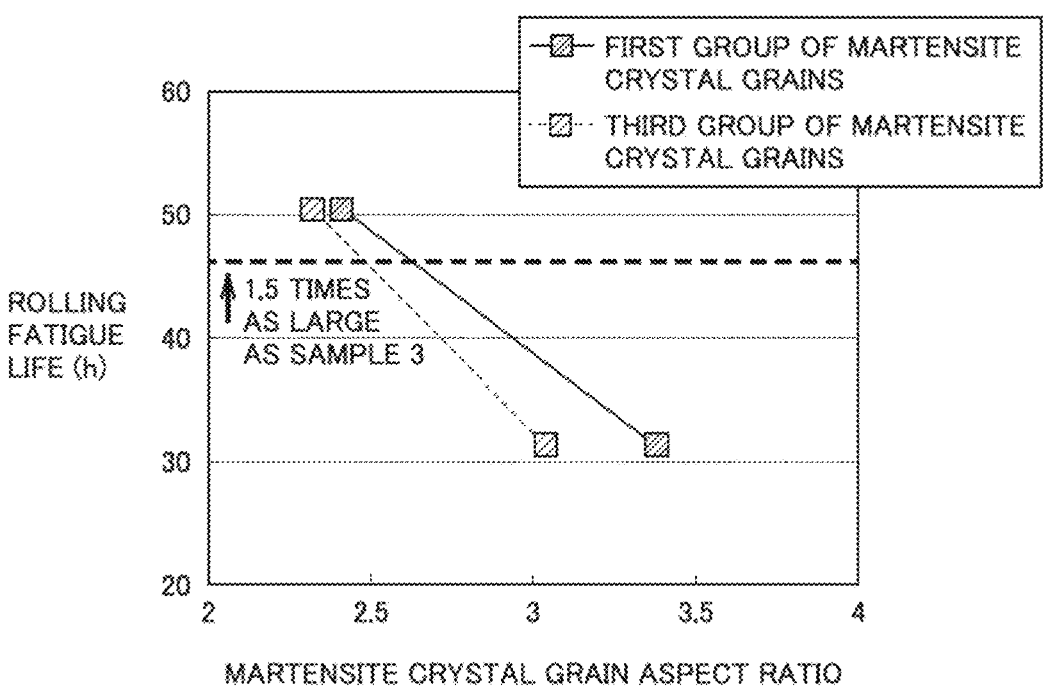
FIG. 9 is a graph showing a relation between an average aspect ratio of the martensite crystal grains and the rolling fatigue life.

FIG. 8 is a graph showing a relation between the average grain size of the martensite crystal grains and the rolling fatigue life. FIG. 9 is a graph showing a relation between the average aspect ratio of the martensite crystal grains and the rolling fatigue life. In FIG. 8, the horizontal axis represents the average grain size (unit: μm) of the martensite crystal grains, and the vertical axis represents rolling fatigue life $L_{50}$ (unit: hour). In FIG. 9, the horizontal axis represents the average aspect ratio of the martensite crystal grains, and the vertical axis represents rolling fatigue life $L_{50}$ (unit: hour).

As shown in FIG. 8 and FIG. 9, rolling fatigue life $L_{50}$ was more improved as the average grain size of the martensite crystal grains belonging to the first group (third group) was smaller, and rolling fatigue life $L_{50}$ was more improved as the average aspect ratio of the martensite crystal grains belonging to the first group (third group) was smaller.

<Static Load Capacity Test Results>

Figure 10:
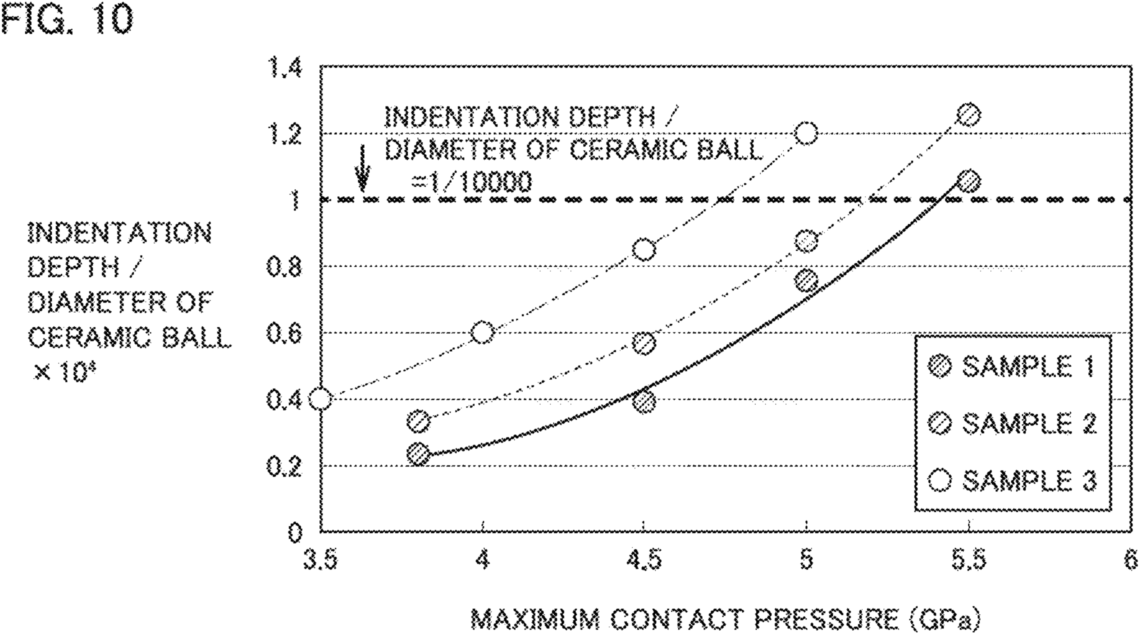
FIG. 10 is a graph showing a relation between a maximum contact pressure and an indentation depth.

FIG. 10 is a graph showing a relation between the maximum contact pressure and the indentation depth. In FIG. 10, the horizontal axis represents the maximum contact pressure (unit: GPa), and the vertical axis represents a value obtained as follows: the indentation depth/the diameter of the ceramic ball$\times 10^4$. As shown in FIG. 10, when the value of the vertical axis was 1, the value of the maximum contact pressure in a curve corresponding to sample 1 was larger than those in curves corresponding to samples 2 and 3. That is, the value of the static load capacity in sample 1 was larger than each of those in samples 2 and 3.

Figure 11:
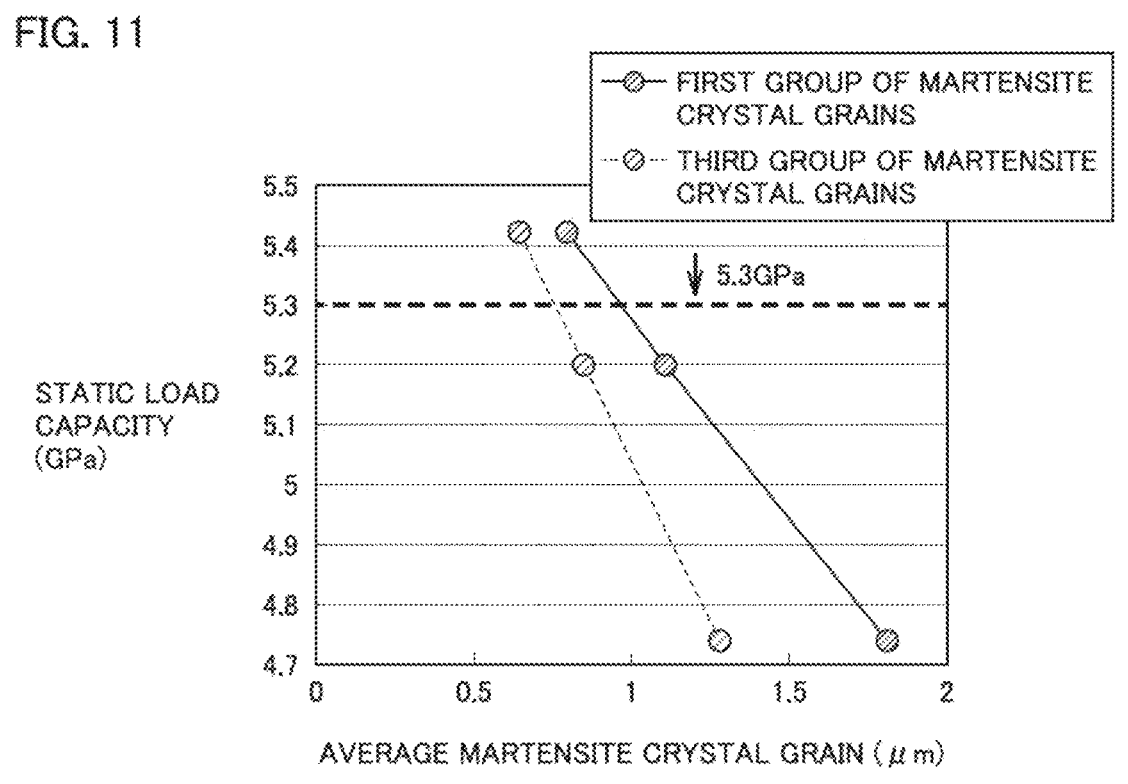
Figure 12:
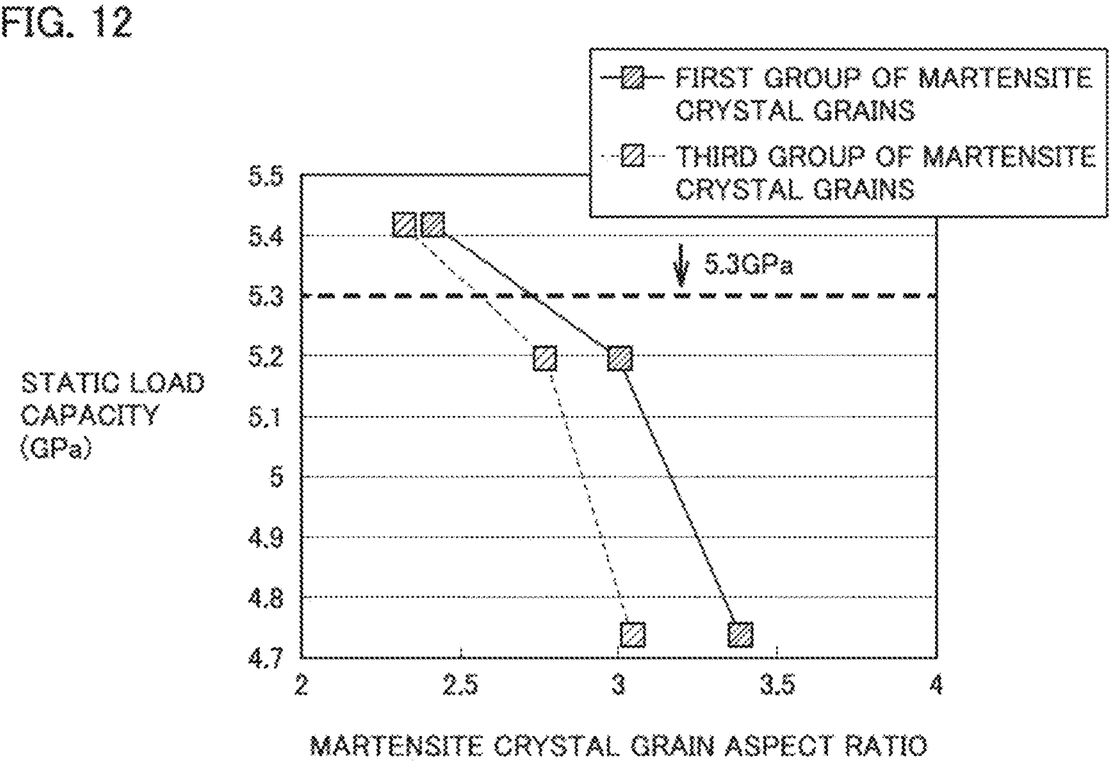
FIG. 12 is a graph showing a relation between the average aspect ratio of the martensite crystal grains and the static load capacity.

FIG. 11 is a graph showing a relation between the average grain size of the martensite crystal grains and the static load capacity. FIG. 12 is a graph showing a relation between the average aspect ratio of the martensite crystal grains and the static load capacity. In FIG. 11, the horizontal axis represents the average grain size (unit: μm) of the martensite crystal grains, and the vertical axis represents the static load capacity (unit: GPa). In FIG. 12, the horizontal axis represents the average aspect ratio of the martensite crystal grains, and the vertical axis represents the static load capacity (unit: GPa).

As shown in FIG. 11 and FIG. 12, the static load capacity was more improved as the average grain size of the martensite crystal grains belonging to the first group (third group) was smaller, and the static load capacity was more improved as the average aspect ratio of the martensite crystal grains belonging to the first group (third group) was smaller. In view of this as well as the results shown in FIG. 8 and FIG. 9, when the average grain size of the martensite crystal grains belonging to the first group (third group) is less than or equal to 0.97 μm (less than or equal to 0.75 μm) and the average aspect ratio of the martensite crystal grains belonging to the first group (third group) is less than or equal to 2.57 (less than or equal to 2.45), it is possible to achieve a rolling fatigue life $L_{50}$ that is 1.5 or more times as large as rolling fatigue life $L_{50}$ of the conventional one (i.e., rolling fatigue life $L_{50}$ of sample 3) and it is possible to achieve a static load capacity of more than or equal to 5.3 GPa.

From such test results, it has been also experimentally indicated that according to the bearing part according to the embodiment, the rolling fatigue strength and static load capacity are improved due to the fine crystal grains.

Although the embodiments of the present invention have been illustrated, the embodiments described above can be modified in various manners. Further, the scope of the present invention is not limited to the above-described embodiments. The scope of the present invention is defined by the terms of the claims, and is intended to include any modifications within the scope and meaning equivalent to the terms of the claims.

INDUSTRIAL APPLICABILITY

The above-described embodiment is applied particularly advantageously to a bearing part and a rolling bearing employing the bearing part.

REFERENCE SIGNS LIST

10: inner ring; 10*a*: upper surface; 10*b*: bottom surface; 10*c*: inner circumferential surface; 10*d*: outer circumferential surface; 10*e*: center axis; 11; quench-hardened layer; S1: preparing step; S2: carbonitriding step; S3: first tempering step; S4: quenching step; S5: second tempering step; S6: post-process step.

The invention claimed is:

1. A bearing part composed of a steel, the bearing part comprising a quench-hardened layer in a surface of the bearing part, wherein the quench-hardened layer includes a plurality of martensite crystal grains and a plurality of austenite crystal grains, each martensite crystal grain of the plurality of martensite crystal grains is determined such that a crystal orientation deviation between adjacent martensite crystal grains is more than or equal to 15°, a ratio of a total area of the plurality of martensite crystal grains in the quench-hardened layer is more than or equal to 70%, a ratio of a total area of the plurality of austenite crystal grains in the quench-hardened layer is less than or equal to 20%, the quench-hardened layer contains nitrogen, an average nitrogen concentration of the quench-hardened layer is more than equal to 0.15 mass % between the surface and a position at a distance of 10 μm from the surface of the bearing part, the plurality of martensite crystal grains are classified into a first group and a second group, all of crystal grain sizes belonging to the first group martensite is larger than all of crystal grain sizes belonging to the second group martensite, a value obtained by dividing a total area of the martensite crystal grains belonging to the first group by the total area of the plurality of martensite crystal grains is more than or equal to 0.5, a value obtained by dividing, by the total area of the plurality of martensite crystal grains, a total area of the martensite crystal grains belonging to the first group, except for a martensite crystal grain that has a minimum crystal grain size in the first group, is less than 0.5, an average grain size of the martensite crystal grains belonging to the first group is less than or equal to 0.97 μm, and an average aspect ratio of the martensite crystal grains belonging to the first group is less than or equal to 2.57.

2. The bearing part according to claim 1, wherein the steel is a high carbon chromium bearing steel SUJ2 defined in JIS.

3. The bearing part according to claim 2, wherein a hardness of the quench-hardened layer in the surface is more than or equal to 730 Hv.

* * * * *